United States Patent
Camras et al.

(10) Patent No.: US 12,360,444 B2
(45) Date of Patent: *Jul. 15, 2025

(54) VEHICLE SIDE AND REAR EXTERIOR ILLUMINATION AND PROJECTION

(71) Applicant: LUMILEDS LLC, San Jose, CA (US)

(72) Inventors: Michael Camras, San Jose, CA (US); Jyoti Kiron Bhardwaj, Cupertino, CA (US)

(73) Assignee: Lumileds LLC, San Jose, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 17/947,987

(22) Filed: Sep. 19, 2022

(65) Prior Publication Data

US 2023/0028468 A1    Jan. 26, 2023

Related U.S. Application Data

(63) Continuation of application No. 16/727,709, filed on Dec. 26, 2019, now Pat. No. 11,480,854.

(Continued)

(51) Int. Cl.
*G03B 21/14*    (2006.01)
*B60K 35/00*    (2024.01)
(Continued)

(52) U.S. Cl.
CPC ............. *G03B 21/14* (2013.01); *B60Q 1/085* (2013.01); *B60Q 1/245* (2013.01); *B60Q 1/2696* (2013.01);
(Continued)

(58) Field of Classification Search
CPC ........ G03B 21/14; B60Q 1/085; B60Q 1/245; B60Q 1/2696; B60Q 1/543; B60Q 1/549; B60Q 2400/50; B60Q 1/32; B60Q 2300/45; H05B 47/125; H05B 45/20; H05B 47/115; B60K 35/00; B60K 2360/334; B60K 35/21; B60K 35/70; B60K 35/80; B60K 35/85; B60K 35/60; B60K 2360/797; Y02B 20/40
(Continued)

(56) References Cited

U.S. PATENT DOCUMENTS 7,233,311 B2    6/2007    Okubo et al.
10,134,280 B1    11/2018    You
(Continued)

FOREIGN PATENT DOCUMENTS

DE    102010046517 A1    4/2011

*Primary Examiner* — Magda Cruz

(57) ABSTRACT

Systems, devices, and methods are disclosed in which one or more light sources, a detector, a processor and a controller are configured such that light from the one or more light sources can provide illumination or projections that can reduce accidents while the vehicle is in motion and when parked and may also provide information and illumination to the driver and vehicle occupants when entering or exiting the vehicle. These systems may, for example, provide spot illumination to moving objects or pedestrians on the road surface, with the spot illumination following the moving object. Alternatively or in addition these systems may project images on the ground, for example to communicate information to occupants of the vehicle, to occupants of another vehicle, or to pedestrians.

20 Claims, 6 Drawing Sheets

Related U.S. Application Data

(60) Provisional application No. 62/785,121, filed on Dec. 26, 2018.

(51) Int. Cl.
  *B60Q 1/08* (2006.01)
  *B60Q 1/24* (2006.01)
  *B60Q 1/26* (2006.01)
  *B60Q 1/50* (2006.01)
  *H05B 47/125* (2020.01)

(52) U.S. Cl.
  CPC ............ *H05B 47/125* (2020.01); *B60K 35/00* (2013.01); *B60K 2360/334* (2024.01); *B60Q 1/543* (2022.05); *B60Q 1/549* (2022.05); *B60Q 2400/50* (2013.01)

(58) Field of Classification Search
  USPC .......................................................... 353/13
  See application file for complete search history.

(56) References Cited

U.S. PATENT DOCUMENTS

| | | |
|---|---|---|
| 11,480,854 B2 * | 10/2022 | Camras .................. B60K 35/21 |
| 2007/0102214 A1 | 5/2007 | Wittorf et al. |
| 2011/0068910 A1 * | 3/2011 | Iwai ...................... F21S 41/663 |
| | | 340/435 |
| 2012/0044090 A1 | 2/2012 | Kahler et al. |
| 2012/0206050 A1 | 8/2012 | Spero |
| 2015/0145698 A1 | 5/2015 | Werner et al. |
| 2015/0353003 A1 | 12/2015 | Salter et al. |
| 2016/0114720 A1 | 4/2016 | Schlaug et al. |
| 2017/0182934 A1 | 6/2017 | Arita et al. |
| 2018/0056854 A1 | 3/2018 | Kunii et al. |
| 2018/0118095 A1 | 5/2018 | Kunii et al. |
| 2018/0182111 A1 | 6/2018 | Shinohara et al. |
| 2018/0257548 A1 * | 9/2018 | Suzuki ...................... B60Q 1/04 |
| 2018/0319320 A1 | 11/2018 | Tatara et al. |
| 2019/0005727 A1 * | 1/2019 | Tanaka ................. G06V 20/588 |
| 2019/0197881 A1 | 6/2019 | Camras et al. |
| 2019/0197882 A1 | 6/2019 | Camras et al. |
| 2019/0197883 A1 * | 6/2019 | Camras .................. B60Q 1/2673 |
| 2019/0202337 A1 * | 7/2019 | Kurebayashi ........... B60Q 1/085 |
| 2019/0202345 A1 * | 7/2019 | Hennes ................. B60Q 1/1415 |
| 2019/0270403 A1 | 9/2019 | Sobecki et al. |
| 2020/0166192 A1 | 5/2020 | Sugimoto et al. |
| 2020/0198527 A1 | 6/2020 | Koehler et al. |
| 2021/0078484 A1 | 3/2021 | Fujii et al. |

* cited by examiner

VEHICLE SIDE AND REAR EXTERIOR ILLUMINATION AND PROJECTION

CROSS REFERENCE TO RELATED APPLICATIONS

This application is a continuation of U.S. application Ser. No. 16/727,709 filed on Dec. 26, 2019, which claims priority to U.S. Provisional Patent Application 62/785,121 filed on Dec. 26, 2018. All of the above-listed applications are incorporated herein by reference in its entirety.

FIELD OF THE INVENTION

The invention relates to vehicle lighting, in particular to vehicle side and rear exterior illumination and projection.

BACKGROUND

Tasks of a motor vehicle driver include anticipating the movements of other vehicles traveling in the vicinity in both directions, avoiding pedestrians and cyclists or others on personal transport (all collectively referred to herein as "pedestrians") that are in or entering the path of the vehicle, properly determining road conditions, and ensuring proper vehicle road illumination for themselves and other vehicles in the vicinity.

SUMMARY

This specification discloses systems and methods in which one or more light sources, a detector, a processor and a controller are configured such that light from the one or more light sources can provide illumination or projections that can reduce accidents while the vehicle is in motion and when parked and may also provide information and illumination to the driver and vehicle occupants when entering or exiting the vehicle.

These systems and methods may, for example, provide spot illumination to moving objects or pedestrians on the road surface, with the spot illumination following the moving object. Alternatively or in addition these systems may project images on the ground, for example to communicate information to occupants of the vehicle, to occupants of another vehicle, or to pedestrians.

These systems and methods may be adapted to any vehicle including, but not limited to: automobiles, trucks, buses, trains, aircraft (e.g., airplanes and helicopters), motorcycles, scooters, forklifts, and watercraft.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

Figure 1:
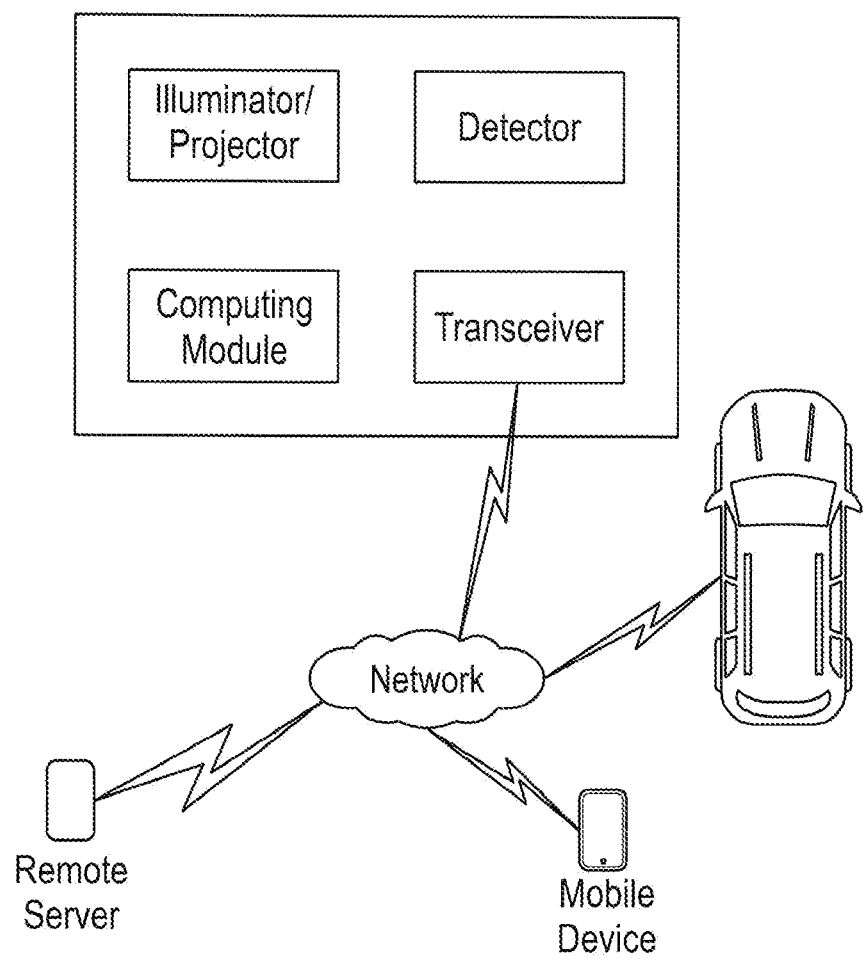
FIG. 1 is a block diagram of an example embodiment of an exterior illumination and projection light system as disclosed herein.

Referring to FIG. 1, a vehicle exterior illumination and/or projection light system comprises one or more light sources employed as illuminators or projectors, one or more detectors configured to detect motions of objects or occupants exterior to the vehicle, and a computing module that comprises a processor configured to receive and process signals from the one or more detectors and a controller configured to receive signals from the processor and in response control the one or more light sources.

As summarized above, the vehicle illumination system can provide spot illumination to moving objects or pedestrians on the road surface, with the spot illumination following the moving object, and/or project images on the ground, for example to communicate information to occupants of the vehicle, to occupants of another vehicle, or to pedestrians.

Also as shown in FIG. 1, the system may further comprise a transceiver allowing it to communicate with another processor in the vehicle, or with a network, for example to receive instructions from an occupant of the vehicle.

Illuminance (E) is the amount of light that falls on an area of a surface and can be measured in units of lux (lx) and is the same as lumens/m$^2$ (lm/m$^2$). The illuminance on a plane normal to the direction of propagation of light, such as the surface of a street, is equal to the luminous intensity (I) divided by the square of the distance (D). The distance D is the mounting height (h) of the light source divided by the cosine of the angle between a vertical line at the measurement point on the street surface to the line connecting the point to the light source:

$E = I/D^2 = I/(h/\cos \gamma)^2 = I \cos^2 \gamma / h^2$ and for the point on the street directly beneath the light source)($\gamma = 0°$, then $E = I/h^2$.

The illuminance on the street surface is the illuminance E multiplied by the cosine of the angle between the direction of propagation of light to the street and the street is the horizontal illuminance $E_{horiz}$ and is the illuminance on the horizontal street surface:

$$E_{horiz} = I \cos \gamma / D^2 = (I \cos \gamma)/(h/\cos \gamma)^2 = I \cos^3 \gamma / h^2.$$

For a pedestrian walking across the street, the illuminance on the pedestrian is the illuminance E multiplied by the cosine of the angle between the direction of propagation of light to the pedestrian and plane normal. This is the vertical illuminance $E_{vert}$ and is the illuminance on a vertical surface, such as a pedestrian. If the height of the pedestrian is $h_p$, then the vertical illuminance on the pedestrian is:

$$E_{vert} = I \sin \gamma / D^2 = (I \sin \gamma)/((h-h_p)/\cos \gamma)^2 = I \sin \gamma \cos^2 \gamma /(h-h_p)^2.$$

Luminance (L) is the light emitted, transmitted, or reflected from a surface in a specific direction per unit area and can be measured in $Cd/m^2$ or nit. A candela is the same as a lumen/steradian (lm/sr). In the case of the pedestrian on the street, an observer in a vehicle would perceive the luminance of the (vertical) illuminance reflected off the pedestrian. This is related to how bright the pedestrian appears when viewed from a specific direction, however the appearance of the surroundings and the observer's eye adaptation level with the object luminance also come into play. In the case of a projection on a street, an observer in a vehicle or a pedestrian on the street would perceive the luminance of the (horizontal) illuminance reflected off the street. Luminance and contrast are both used in calculating the appearance of an object, pedestrian or projected image in these cases.

Light on a surface is either reflected, absorbed, and/or transmitted. For the projection and pedestrian, we are mainly concerned with reflected light. There are various types of reflected light such as specular and diffuse. Specular such as a reflection from a mirror or mirror like surface is reflected at an opposite angle of incidence and with an intensity nearly equal to the incident ray. For a diffuse reflecting surface, light is scattered and reflected in all directions. An image projected onto a wet street may have a specular component of reflection and an image projected onto a snow covered street may have a mostly diffuse reflection. For illuminating a pedestrian, clothing is mostly a diffuse reflector. The luminance of a perfectly diffuse reflector is:

$$L = RE/\pi,$$

where R is the reflectance, E is the illuminance, and $\pi$ is pi steradians.

The luminance coefficient q defines the reflection properties of a pavement surface at a particular point p and is the ratio of luminance L to the horizontal illuminance $E_{horiz}$ at that specific point on the pavement surface. High q values are associated with brighter, more reflective surfaces and is dependent on a number of variables, such as the position of the observer, the light source relative to the point of interest on the pavement surface, the properties of road the surface material, etc. Assumptions are sometimes made to reduce the number of variables, such as the observation angle from the horizontal can be standardized to 1 degree and the isotropic properties of most pavements can be assumed for a constant angle between the plane of observation and the road axis. This leaves the light incident angle from vertical $\gamma$ and the angle $\beta$ between the horizontal line of the plane of observation and the horizontal line extending beyond point p that joins point p to a horizontal point directly below the light source, such that:

$$q(\beta, \gamma) = L/E_{horiz} = L/(I \cos^3 \gamma /h^2) = L h^2/(I \cos^3 \gamma)$$

The reduced luminance coefficient r is defined as q $\cos^3 \gamma$:

$$r(\beta, \gamma) = q(\beta, \gamma) \cos^3 \gamma = L h^2/I$$

The reduced luminance coefficient r is used in what are called the r-tables that characterize the reflection properties of pavement materials. In such tables, which are readily available or may be readily produced, typically the two dimensions of the r-table are the angle $\beta$ and the tangent of the angle $\gamma$ with each value of the reduced luminance r coefficient multiplied by 10000. $\beta$ is tabulated from 0 to 180 degrees and assumed symmetrical about the observation plane, and tan $\gamma$ is tabulated from 0 to 12 or $\gamma$ from 0 to around 85 degrees. These angles cover a zone on the roadway to 12 times the height h of the luminaire from the road surface along the road in the direction of the observer, 4h along the road in the direction away from the observer, and ±3h across the road. A dry road surface is assumed and any luminaire outside this zone contributes very little to the road surface luminance and can be neglected.

In practice, every road might require its own unique r-table that would change over time and from section to section as different parts to the road wear differently. Additional parameters are defined to limit the number of r-tables necessary and to increase the number of different road surfaces that can be approximated by a single r-table. Two parameters have emerged as important and are in common use: $Q_0$ is the average luminance coefficient and is a measure of the lightness of the road and $S_1$ relates to the specularity of the road. $Q_0$ is the average value of the luminance coefficient $q(\beta, \gamma)$ over a solid angle, $\Omega_0$ and includes all the light rays that significantly contribute to what the observer sees and represents the overall reflections properties of the road surface:

$$Q0 = \frac{1}{\Omega 0} \int_0^{\Omega 0} q(\beta, \gamma) d\Omega$$

$S_1$ is the ratio of reduced luminance coefficients r for two specific directions of the incident light and is a measure of specular reflection of road surface:

$$S1 = \frac{r(\beta = 0°, \tan\gamma = 2°)}{r(\beta = 0°, \tan\gamma = 0°)}$$

When possible, measuring the reflection characteristics of a surface with a gonioreflectometer with surface samples or in the field with a portable instrument where many measurements may be taken may be desirable for accurate characterization. When it is not possible to measure the road surface itself, measurements from nearby roadways using similar compositions and materials can be evaluated. Baseline measurements from vehicle sensors may be used to set projection image intensity, color, and size. Ambient light detection and roadway reflectivity measurements can be used for example. Light reflectivity and Q0 is generally higher for concrete than asphalt and spectral reflectance for both tend to increase with increasing wavelength although eye sensitivity also falls off into the red. Total roadway reflectance typically peaks at around 560 nm.

Contrast is the visual difference between an object such as a projection and its background and is often expressed as:

$$C=(L_p-L_{background})/L_{background}.$$

Contrast can be positive or negative and can range from very large positive numbers when the background luminance is very low to something close to −1 when the object luminance is very low. However, for a lighted projection (brighter than ambient or background) contrast C will be positive and for a shadow or dark projection (projection dimmer than ambient or background) contrast C will be negative.

For the Lit Projection, $$C=((R_p E_{horiz}/\pi)-L_{background})/L_{background}.$$

The only variable that can be controlled is the horizontal illuminance on the street from the projection light source. The background luminance is determined by the surroundings and can be very low in a rural setting or very bright in a city street setting with many well-lit retail stores. The reflectivity of the projection $R_p$ is largely determined by the roadway composition and materials. Bright road surfaces from sunlight or bright lighting from shops and stores at night increase the background luminance and reduce contrast that make it more difficult to discern a positive contrast projection. To compensate for a higher background luminance $L_{background}$, horizontal illuminance $E_{horiz}$ must be increased for an observer to clearly see a projection.

Whether the contrast of the projection is positive or negative (contrast polarity) and the uniformity of the contrast across the projection (contrast variance) are two other important issues in determining the visibility of a projection on a road. Both contrast polarity and variance will change as a function of distance the vehicle driver is from the projection.

Lighting systems must insure that the projection becomes visible at distances that provide adequate time for the observer whether pedestrian or driver to respond and in the drivers case the slow or stop the vehicle. In actuality, the contrast of a projection may not uniform. Depending on background luminance a horizontal illuminance $E_{horiz}$ of at least 10, 20, or 30 lx is needed to provide adequate projection visibility.

Glare is another consideration in designing a projection illumination system. Glare can be from an opposing vehicle's headlamps approaching between the observer and the projection or from a wet road surface reflecting light towards the observer. Glare happens when luminance is much higher than the luminance to which the observer's eyes are adapted to. Discomfort glare occurs when the observer experiences discomfort or pain when viewing the light source, but disability glare limits or prevents the observer from performing a visual task, such as discerning a projection or the associated dangers. Projection lighting systems will need to mitigate disability glare.

An object such as a projection has a threshold contrast $C_{Threshold}$ at which the projection may just be detected that is a probability of detection of 50% and depends on such things as visual angle α of the object that is related to object size, length of observation time $t_{observe}$, the adaption luminance $L_{adaption}$ of the observer, and the age of the observer. For projection safety, lighting conditions must provide an actual contrast $C_{Actual}$ that is greater than threshold contrast $C_{Threshold}$. The visibility level VL is defined as the ratio of the actual contrast to the threshold contrast:

$$VL=C_{Actual}/C_{Threshold}=C_{Actual}/C_{Threshold}(\alpha, t_{observe}, L_{adaption}, age)$$

The higher the VL, the greater the chances that the projection is seen. VL provides a measure of the performance of a projection system. Visibility level VL for concrete and asphalt as a function of reflectivity R. When R increases from about 0.1 to 0.6 for concrete and from about 0.1 to 0.4 for asphalt, VL decreases and then increases as contrast changes from positive to negative.

Embodiments of this invention include using LED and laser light sources and arrays that can be positioned on the vehicles for exterior projection and illumination particularly to the sides and rear of the vehicle. These projections and illumination can be used for safety warnings and illumination such as lane markings while the vehicle is in motion and safety warnings, greetings and logos, vehicle status, informational, and lighting when the vehicle is stationary. Projection and illumination sources can be located in side view mirrors, rear spoilers, side and rear panels, and near or underneath vehicle locations.

Figure 2:
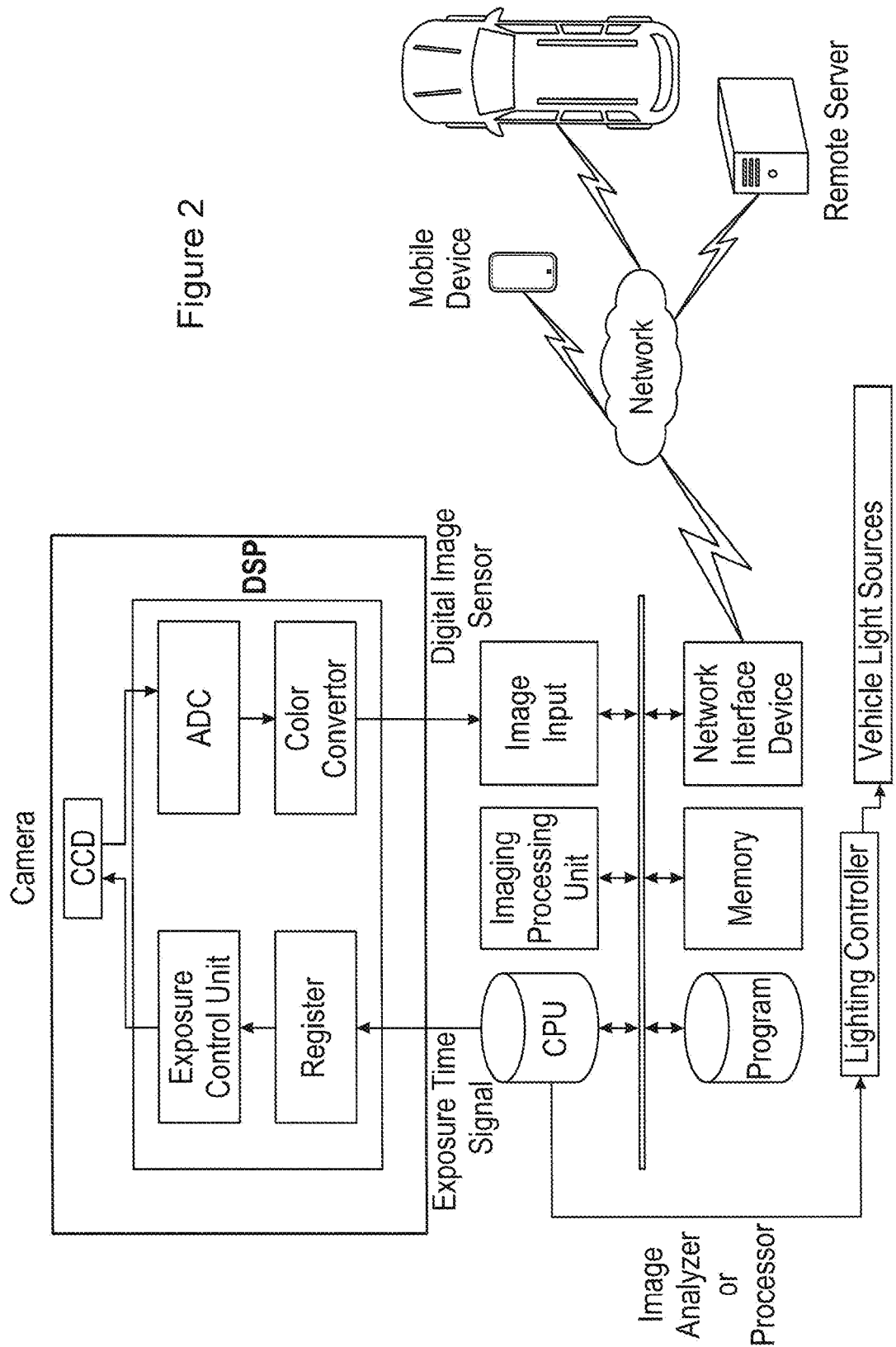
FIG. 2 is a more detailed block diagram of an example embodiment of a vehicle exterior illumination and projection light system as disclosed herein.

Referring again to FIG. 1 as well as to FIG. 2, these illumination systems can employ one or more detectors (e.g., sensors or cameras) that may function in the IR, ultrasonic, radar, and/or LiDAR range. Controllers and processors can take the detector, sensor, and/or camera output signals as input to output lighting control to the light source(s) and control the lighting of pixel elements in a matrix array by controlling which CMOS transistors are turned on and off, or controlling the laser beam rastering of color converting elements or pixels via a MEMS based mirror array or an acousto-optic reflector or deflector, for example.

Also or in addition vehicle to vehicle, infrastructure, pedestrian, target, or object (V2X) communications may be used to provide position, speed, vehicle type and dimensions, etc. to adaptive front, rear, and side exterior lighting systems. GPS communications may additionally be used. Imaging processors can take the input of a camera, IR sensors, LiDAR, radar, ultrasound receivers and such, to map out an image of the traffic and pedestrian situation that can include location, speed, direction, etc. and send a controller that can be optionally integrated with the processor a signal to control one or more lighting fixtures, light projections of warning images such as traffic type signs that can be multicolor and include text, as well as crosswalk projections, and pedestrian highlight, and communications to the vehicles and pedestrians.

For example, a spot light can illuminate a pedestrian and multiple spot lighting providing ample illuminance in the vertical plane $E_{vert}$ (horizontal light on the pedestrian) can be used for each pedestrian in the crossing that can emanate from a single light source such as an array or multiple light sources spatially separated can be used. The spot illumination need not be circular in shape and may be any shape that illuminates the pedestrian(s) and can follow the pedestrian(s) in real time.

This spot illumination can be provided by light rays traveling in a direction horizontal to the pavement and normal to the vertical plane of the pedestrian and increase the vertical illuminance $E_{vert}$. Some extra spot illumination may be provided to the pavement area $E_{horiz}$ surrounding the pedestrians, enough to get attention of the vehicle driver, but not enough to significantly decrease the pedestrian contrast. The horizontal illuminance can also follow the pedestrian(s) in real time can be any shape including for instance a rectangular section of the crossing that follows the pedestrian(s) movement.

This $E_{horiz}$ illuminance can be in the form of a projection, where the area surrounding the pedestrian can be highlighted with a projection on or above the pavement, for example a partial or full circular-oval or square-rectangular type shape in white and red for example and a green arrow can be projected indicating the direction of movement. The horizontal illumination that is not part of the projection can be suppressed in an area around the pedestrian and the projection to maximize contrast, this suppressed or dark spot of horizontal illumination $E_{horiz}$ can also follow the pedestrian.

Projections of traffic signs images that can include text and color can be projected on the ground.

An infrared (IR) light source, for example a VCSEL or LED array can be used with a camera to detect pedestrians. The IR light sources may be mounted in or integrated with the visible light sources or may be mounted separately. The camera can also detect the higher intensity white headlight beams of an oncoming vehicle as well as the lower intensity red taillights of a passing vehicle.

Referring again to FIG. 2, the camera may comprise a CCD and digital signal processor (DSP) that communicate with each other. The DSP may also communicate with the processor or an image analysis unit that can have an image input to which the DSP connects, an imaging processing unit, a CPU that can send an exposure signal back to the camera DSP, program, and memory.

The camera DSP may further comprise an analog digital converter (ADC) that receives a CCD input, a color converter unit that outputs a digital image signal to the image input of the imaging processing unit, an exposure control unit that outputs a signal to the CCD, a register that receives an exposure signal from the CPU of the image processing unit and outputs signals to the exposure control unit and the color converter unit.

The CPU of the image analysis unit or processor can output a signal to a controller of the light sources. Based on the processor output, the controller can turn on and off various light sources and control the beam pattern from each of the individual light sources. Optionally the CPU of the image analysis unit or processor can also output a signal to a control unit of the IR light source, or the controller can operate and control all the light sources including the visible and IR. This illustrates one embodiment and instead of or in addition to a camera and IR source, ultrasonic, LiDAR, radar, and/or heat sensors that may detect IR may be used.

The projector/illuminator can be laser or LED based and use reflectors, lenses, and mirrors. The detector can include one or more sensors to detect motion and/or distance and can be for example a gyroscope, an accelerometer, GPS receiver, camera, or microphone. The transceiver can connect to a network or Ethernet and receive and transmit information to a remote server, a mobile device, or vehicle for example. Weather, traffic, and/or road conditions can be transmitted to the portable device from the remote server. Mobile devices such as mobile phones, PDAs or other like devices can transmit information about vehicles and other pedestrians to the portable device and visa-versa.

The computing module can take the detector and transceiver inputs to generate appropriate illumination and/or projection display images, text messages, and colors based on these inputs. The computer module can also send appropriate warnings via the transceiver to mobile devices, vehicles, and remote servers through the network or Ethernet. This system is particularly useful when street crossings are made by pedestrians at non-designated mid-street and intersections and pedestrians or bicycle riders walking or riding along a dimly lit or busy street.

The controller and processor can be integrated together in the same unit or module. Likewise, visible and IR light source can be integrated together in the same fixture or any optional supplemental radiation source such as ultrasonic, radar, VCSEL, LED array, or LiDAR can be integrated together in a fixture. It is also possible to integrate all electronics together in the light source, so that detector radiation, detector, processor, controller as well as visible light emitting elements are together in a module or fixture that may be termed as a smart light or smart lighting source.

The lighting system includes one or more light sources that can provide a horizontal and vertical illuminance. In various embodiments the horizontal illuminance can be less than the vertical illuminance, the horizontal illuminance can be equal the vertical illuminance, and the horizontal illuminance can be greater than the vertical illuminance. For the projection, in general, it is desirable that the horizontal illuminance be greater than the vertical illuminance, so that the projection is in positive contrast and background luminance is minimized.

In addition to a projection, an optional illumination can provide spot lighting and work in conjunction with the projection that provides a line or boundary, partial or full around a pedestrian and/or the projection can be in the image of a traffic sign or text message. These projections can be projected on the ground or pavement and can have a local horizontal illuminance that is much higher than the surrounding horizontal illuminance. In these embodiments with projections, the horizontal illuminance of the projection can be higher than the surrounding local horizontal illuminance and approach the vertical illuminance of the occupants or pedestrian, be equal to the vertical illuminance of the occupants or pedestrian, or be greater than the vertical illuminance of the occupants or pedestrian.

Preferably, the spatial zone of the projection does not significantly overlap with the spatial zone of the vertical illuminance of the occupants or pedestrian and cause a lowering of contrast of the pedestrian or the projected image.

In one embodiment, the horizontal illuminance is one-half or more the vertical illuminance. In another embodiment, the horizontal illuminance is at least equal to the vertical illuminance. In yet another embodiment, the horizontal illuminance is at least twice the vertical illuminance. In another embodiment, the horizontal illuminance is at least five times the vertical illuminance. In another embodiment, the horizontal illuminance of the projection is at least twice the horizontal illuminance of the surroundings. In another embodiment, the horizontal illuminance of the projection is at least five times the horizontal illuminance of the surroundings. In an embodiment, the horizontal illuminance of the projection can be about equal to the vertical illuminance of the occupants or pedestrian. In another embodiment, the vertical illuminance of the projection can be greater than the horizontal illuminance of the pedestrian. In an embodiment, the vertical illuminance of the occupants or pedestrian has minimal overlap with the horizontal illuminance of the projection. In an embodiment, the luminance of a projection is at least twice luminance of the background or local background (outside of a projection). In another embodiment, the luminance of a projection is at least five times the luminance of the background. In yet another embodiment, the luminance of a projection is at least ten times the luminance of the background. In one embodiment, the horizontal illuminance of a projection is at least 10 lx. In another embodiment, the horizontal illuminance of a projection is at least 20 lx. In yet another embodiment, the horizontal illuminance of a projection is at least 30 lx. In still another embodiment, the horizontal illuminance of a projection is at least 50 lx. In still yet another embodiment, the horizontal illuminance of a projection is at least 100 lx. Our invention can also include spot lighting or illumination of the pedestrian, where the vertical illumination of an object or pedestrian can be greater than the vertical illumination outside the spatial zone of this spot illumination. In an embodiment, the spot vertical illumination is at least 1.5 times the vertical illumination outside the spot. In another embodiment, the spot vertical illumination is at least twice the vertical illumination outside the spot. In yet another embodiment, the spot vertical illumination is at least five times the vertical illumination outside the spot. The horizontal illumination can also be dimmed or turned off around the pedestrian and this dark hole follows the pedestrian, so that the vertical illumination of the spot lighting and horizontal illumination of the optional projection can be viewed with increased contrast to a vehicle driver. The power consumption for the vehicle lighting system of this invention can be lower than conventional systems.

As noted above, the illumination and/or projection devices used in the systems, devices, and methods described herein may be or include an LED array or laser. An LED and laser device is discussed in U.S. patent application Ser. No. 15/802,273, which is hereby incorporated herein by reference in its entirety. Some aspects of such LED arrays are further described next, with reference to FIG. 3A-FIG. 7.

Figure 3A:
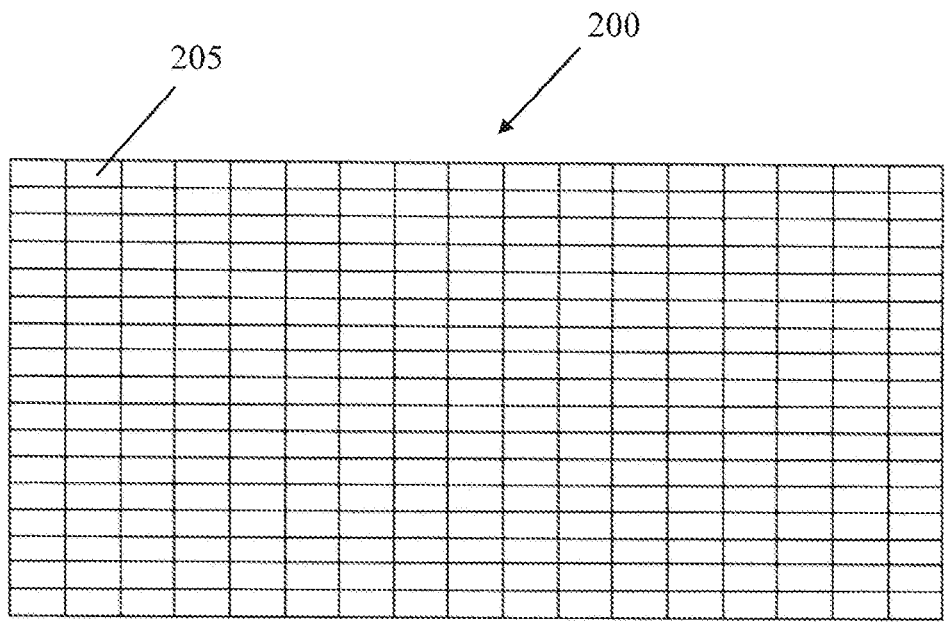
FIG. 3A and FIG. 3B, respectively, show plan and schematic views of an example M×N matrix pixelated microLED that may be used in light sources in an interior vehicle lighting system as described herein.
Figure 3B:
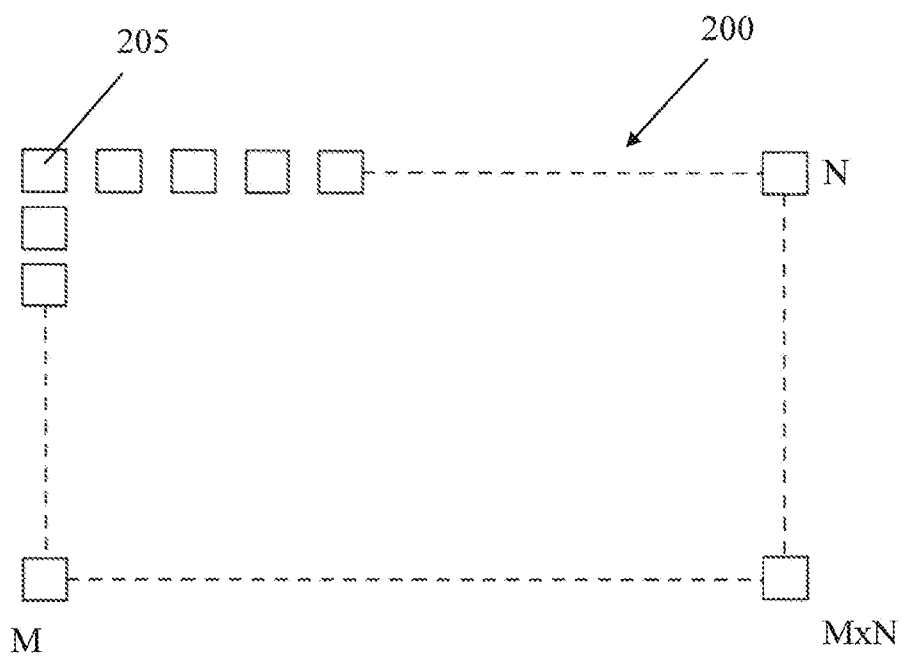

FIGS. 3A and 3B show plan and schematic views of an example M×N matrix pixelated microLED 200, comprising M×N pixels 205. The number of individual pixels in the array can be, for example, 2 to 10 and can be used in a mobile phone flash and the like, 10 to 50 in some embodiments, 50 to 100 in some embodiments, 100 to 500 in other embodiments, 500 to 1000 in other embodiments, 1000 to 2500 in yet other embodiments, 2500 to 5000 in yet other embodiments, 5000 to 10000 in still yet other embodiments, these can be used for instance in adaptive vehicle headlights, adaptive street lights, adaptive crosswalk illumination and the like. Still other embodiments include 10000 to 100000 and 100000 to 500000 that can use LED or laser light sources, 500000 to 1000000, and 1000000 to 100000000 that can use laser light source or sources such as a raster scanned laser(s) may be used. Raster scanning may be accomplished with a microelectromechanical system (MEMS) based mirror or with an acousto-optic reflector or deflector. These embodiments can be suitable for displays.

Figure 4A:
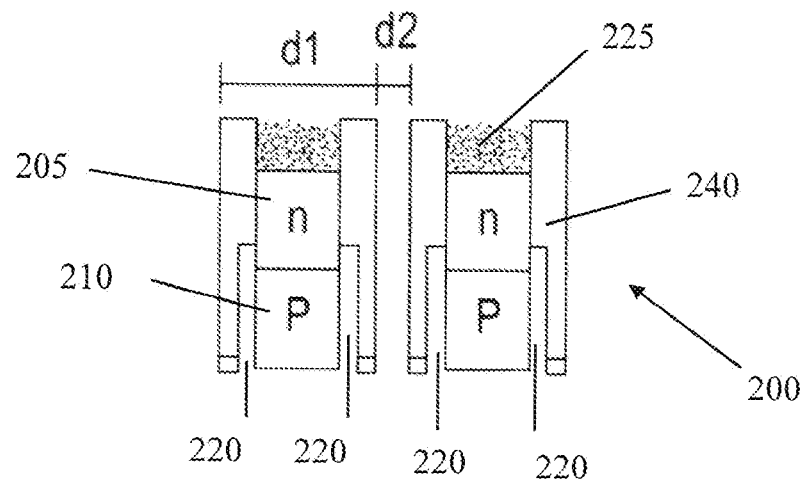
FIG. 4A shows a schematic partial cross-sectional view of a portion of an example M×N matrix pixelated microLED that may be used in light sources in an interior vehicle lighting system as described herein.

FIG. 4A shows a partial cross sectional view of one embodiment of an LED matrix array 200. The n (205) and p-type (210) semiconductor layers sandwich an active region that emits light. The n and p-type semiconductor layers and the active region may themselves contain multiple layers of different doping levels and compositions. For example the active region may be a single light emitting layer, a homojunction, a single heterojunction, a double heterojunction or heterostructure, a single quantum well heterostructure (SQW), a multiple quantum well (MQW) structure, or a superlattice (SL) structure. The n and p-type semiconductor layers may be for example GaN or AlGaN and the active region may be InGaN and GaN. Other semiconductor material systems include AlGaInP, AlGaAs, and AlGaInAsP for example. Once the epitaxial layers are grown, trenches can be etched through the p-layers and into the thicker n-layer.

The p-n junction can be passivated with a dielectric, such as $SiO_x$, $AlO_x$, SiON, SiAlON, $TaO_x$, $AlO_x$, or $Si_3N_4$ or the like to prevent shorting or may be isolated by ion implantation, such as hydrogen, carbon, and oxygen ions for example. In the example of FIG. 4A, such dielectric may be deposited on surfaces of the n and p layers in regions 220. Metal contacting the n-layer and the dielectric can extend to the p-layer side. P-metal may be deposited before or after the trench etch.

In one embodiment, metal contacts 240 to n-type material can extend to the p-side surface with isolation from the p-type material. The p-type and n-type metal electrodes may then be on the same side and can be bonded to a silicon wafer that may contain electronics such as a switching transistor, TVS, open and/or short detection and the like. Bonding can include soldering, such as AuSn or SnAgCu (SAC) solders, or a GGI bond using thermal and ultrasonic energy to form an Au bond interconnect.

The metal may be extended by plating for example past the n-layer after the growth substrate, for example sapphire, is removed. The n-metal can serve as the seed for plating and may be exposed by growth substrate removal, if the p-side trench and metallization extends completely through the n-layer to the substrate, by thinning the n-layer, or a subsequent trench etch from the n-side after substrate removal. The p and n-metal contacts are preferably reflective and may be for example Ag, Al, Ni, Ti, TiW, TiWN, Au, Zn and combinations and layers thereof. The extensions beyond the n-surface can be a reflective metal as described above or a TCO, such as ITO, ISO, AZO, IZO or a dielectric, such as sapphire, photoresist, $SiO_x$, SiON, SiAlON, $TaO_x$, $AlO_x$, or $Si_3N_4$ that may be reflective by TIR or a metallic coating.

Figure 4B:
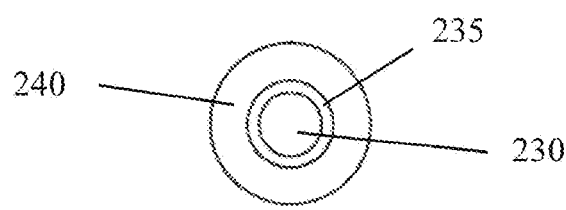
FIGS. 4B and 4C show schematic plan views of example arrangements of n and p electrodes in the example microLED.
Figure 4C:
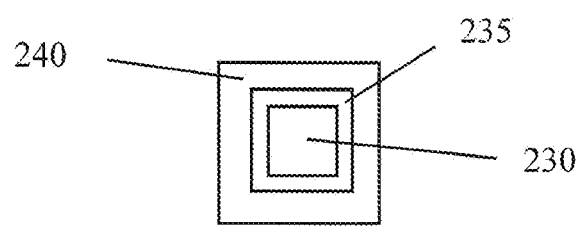
Figure 5A:
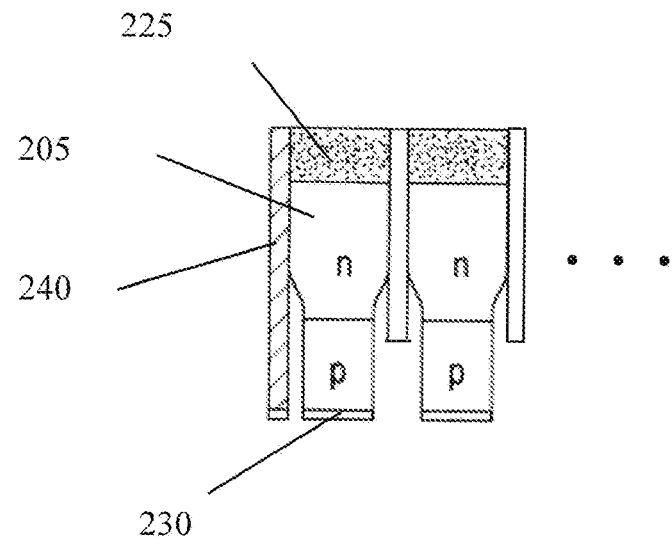
FIG. 5A and FIG. 5B each show schematic partial cross-sectional views of portions of other example M×N matrix pixelated microLED that may be used in light sources in an interior vehicle lighting system as described herein.
Figure 5B:
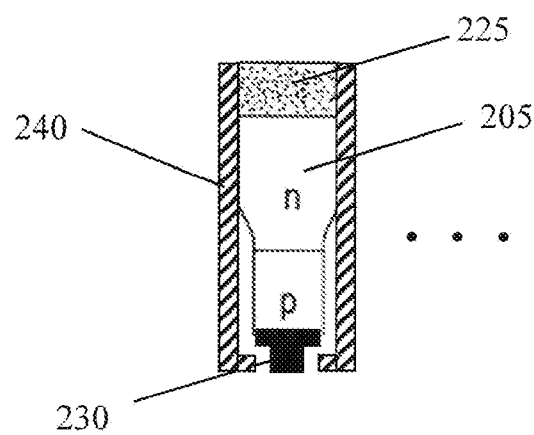
Figure 6:
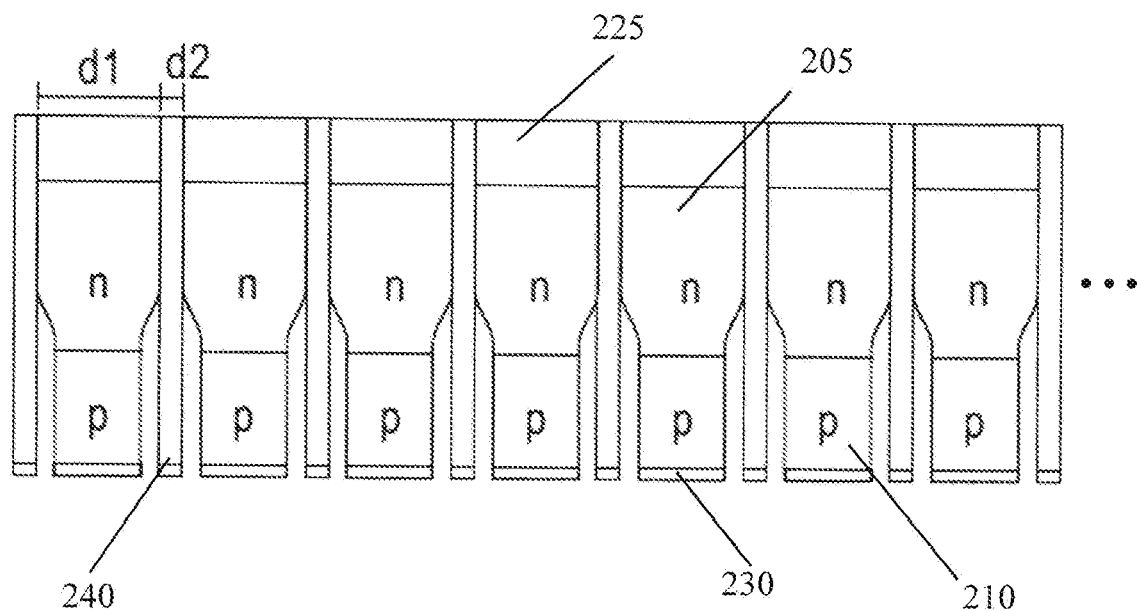
FIG. 6 shows a schematic partial cross-sectional view of a portion of another example M×N matrix pixelated microLED that may be used in light sources in an interior vehicle lighting system as described herein.
Figure 7:
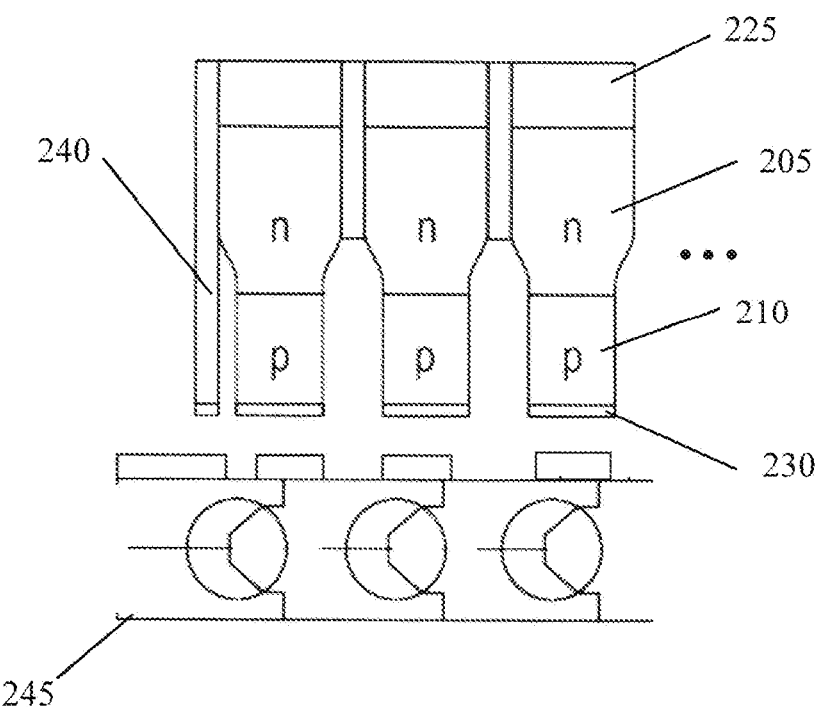
FIG. 7 shows a schematic partial cross-sectional view of a portion of another example M×N matrix pixelated microLED that may be used in light sources in an interior vehicle lighting system as described herein, in combination with a schematic partial cross-sectional view of a portion of a CMOS silicon back plane that may be used to switch pixels in the array on and off.

The extensions may be used to hold or contain a wavelength converter 225, such as phosphor in silicone or other suitable binder or a ceramic phosphor. Phosphor may be applied by dispensing, ink-like jet printing, sedimentation, EPD, stenciling, spraying or molding. The pixel may be for example square, round, oval, or rectangular in shape. FIG. 4B and FIG. 4C show that the p-electrode 230 can be square, rectangular, circular, or oval in shape surrounded by a thin dielectric 235 and the n-electrode 240 around the perimeter. The n-electrode may completely surround (FIG. 4A and FIG. 6), partially surround (FIG. 5A), or be to one side of the p-electrode (FIG. 7). The n-electrode may also overlap the p-electrode separated by a dielectric (FIG. 5B).

The electrodes may be connected in the device or by the Si backplane 245 (schematically shown for example in FIG. 7) in a common cathode or anode configuration. The n and p-layer and electrode positions are shown in the figures for convenience, but their positions can also be swapped that is opposite from what is shown.

Multiple matrix arrays may be used in an illumination device and these multiple arrays may be spaced apart from one another and do not have to be adjacent in an extended matrix configuration. For instance, one matrix in a crosswalk illumination system may provide for crosswalk illumination and another matrix is used to provide spot lighting that follows the pedestrians as they cross the street.

Pixel size d1 (FIG. 4A and FIG. 6) may be for example from submicron to 1 micron, 1 micron to 10 microns, 10 microns to 50 microns, and 50 microns to 500 microns in various embodiments. Pixel spacing d2 may be determined by width of the metal layer (FIG. 6) or may include an actual gap (FIG. 4A). Pixel spacing d2 may be for example less than 0.1 micron, 0.1 to 1 micron, 1 micron to 5 microns, and 5 to 50 microns embodiments. Pixel spacing d2 may depend on pixel size d1.

Pixels may be in any shape or combination of shapes, for example circular, square, rectangular, triangular, hexagonal and combinations thereof. Phosphor particle sizes may depend on pixel size d1 and may be at least d1/10 or smaller in size. The luminous flux of these arrays can be $10^{-4}$ to $10^{-3}$ lumens (lm), $10^{-3}$ to 0.1 lm, 0.1 to 10 lm, 10 to 1000 lm, 1000 to 10000 lm, 10000 to 100000 lm, and 0.1 to $5 \times 10^6$ lm in some embodiments. The luminance of these arrays can be 10 to 100 lux (lx), 100 to 500 lx, 500 to 1000 lx, 1000 to 50000 lx, 50000 to 500000 lx, $0.5 \times 10^6$ to $1 \times 10^6$ lx, $1 \times 10^6$ to $10 \times 10^6$ lx, and $10 \times 10^6$ to $5000 \times 10^6$ lx in some embodiments. The illuminance of these arrays may be 10 to 100 nit, 100 to 1000 nit, 1000 to 10000 nit, 10000 to 100000 nit, $0.1 \times 10^6$ to $1 \times 10^6$ nit, $1 \times 10^6$ to $1000 \times 10^6$ nit in some embodiments. The luminance and illuminance of these arrays can be measured without external optics and can include laser as well as LED arrays. Luminous efficacy can be 1 to 20 lm/W, 20 to 200 lm/W, and 200 to 500 lm/W in some embodiments. These arrays may be packaged with primary optics, such as lenslet arrays or compound parabolic concentrators (CPC) and may include secondary optics such as a projection lens.

This disclosure is illustrative and not limiting. Further modifications will be apparent to one skilled in the art in light of this disclosure and are intended to fall within the scope of the appended claims.

The following enumerated paragraphs (clauses) provide additional non-limiting examples of the disclosure.

1. A vehicle lighting system comprising:
   a light source;
   a detector;
   a processor; and
   a controller;
   wherein the system is configured so that light from the light source illuminates a portion of road surface and provides spot illumination to moving objects on the road surface, such that the spot illumination has the capability to follow the moving object along the portion of the road surface.

1. The lighting system of clause 1, wherein the vehicle lighting system is stationary and provides lighting for a vehicle user.

3. The lighting system of clause 1, wherein the vehicle lighting system is in motion and provides lighting for one of a pedestrian and another vehicle.

4. The lighting system of clause 1, wherein the vehicle is one of automobile, truck, bus, train, aircraft, motorcycles, scooters, forklifts, and watercraft.

5. The lighting system of clause 3, wherein the other vehicle is one of automobile, truck, bus, train, aircraft, motorcycles, scooters, forklifts, watercraft, bicycle, scooter, Segway and skates.

6. The lighting system of clause 1, wherein the light source comprises one of a LED and laser.

7. The lighting system of clause 1, wherein the light source comprises a LED array.

8. The lighting system of clause 7, wherein the light source comprises a LED array capable of emitting visible light of at least one of white, amber, and red.

9. The lighting system of clause 1, wherein the light source comprises a microLED array.

10. The lighting system of clause 1, wherein the light source comprises a laser and wavelength converter.

11. The lighting system of clause 1, wherein the processor receives a signal from a computer of the vehicle.

12. The lighting system of clause 1, wherein the system is further configured to provide a spot of reduced horizontal illuminance that follows the moving object along the portion of the road surface for increased contrast.

13. The lighting system of clause 1, wherein the system further comprises a projection at least partially surrounding and following a pedestrian.

14. The lighting system of clause 1, wherein the projection is one of circular, oval, square, and rectangular.

15. The lighting system of clause 3, wherein the projection further comprises an arrow that indicates the direction of one of the vehicle, pedestrian, and other vehicle.

16. The lighting system of clause 1, wherein the system further comprises a projection of one of a traffic sign and text message visible to another vehicle driver.

17. The lighting system of clause 1, wherein the system further provides a projection that comprises one or more color.

18. The lighting system of clause 17, wherein the color is one of white, amber, and red.

19. The lighting system of clause 9, wherein the microLED array comprises LED chips, mounted and electrically connected to CMOS circuitry on a silicon wafer, wherein the LED chips are separated by a dielectric and metal that extends above a semiconductor surface of the LED chip and is filled with a wavelength converter.

20. The lighting system of clause 1, wherein the system comprises a horizontal illuminance that is at least twice the vertical illuminance.

21. The lighting system of clause 1, wherein the system comprises a horizontal illuminance that is at least five times the vertical illuminance.

22. The lighting system of clause 1, wherein the horizontal illuminance of the projection is at least twice the horizontal illuminance of the surrounding pavement.

23. The lighting system of clause 1, wherein the horizontal illuminance of the projection is at least equal to the vertical illuminance of the object.

24. The lighting system of clause 1, wherein the horizontal illuminance of the projection is greater than the vertical illuminance of the object.

25. The lighting system of clause 1, wherein the system further comprises a transceiver capable of communication with a network.

26. The lighting system of clause 25, wherein the system further comprises a transceiver capable of communication with at least one of a vehicle, a mobile phone, and a remote server over the network.

27. A vehicle illumination device comprising:
   a light source;
   a detector;
   a computer; and
   a transceiver;
   wherein, the light source projects an image on the ground.

28. The vehicle illumination device of clause 27, wherein the light source comprises one of a LED and laser.

29. The vehicle illumination device of clause 27, wherein the detector is one of an accelerometer, gyroscope, and GPS.

30. The vehicle illumination device of clause 27, wherein the detector is one of an accelerometer, gyroscope, and GPS.

31. The vehicle illumination device of clause 27, wherein the transceiver can communicate with at least one of a vehicle, a mobile phone, and a remote server over a network.

32. The vehicle illumination device of clause 27, wherein the image at least partially surrounds and follows an object or pedestrian.

33. The vehicle illumination device of clause 27, wherein the image further comprises an arrow that indicates the direction of the object or pedestrian.

34. The vehicle illumination device of clause 27, wherein the image comprises one of a traffic sign and text message visible to a vehicle driver.

35. The vehicle illumination device of clause 27, wherein the image comprises one or more color.

36. The vehicle illumination device of clause 35, wherein the color is one of white, amber, and red.

37. The vehicle illumination device of clause 27, wherein an observer of the image is one of a pedestrian and a driver of another vehicle.

38. The vehicle illumination device of clause 37, wherein the driver of the other vehicle is one of human and nonhuman.

39. The vehicle illumination device of clause 37, wherein the holder is one of a bicycle, scooter, Segway and skate.

40. The vehicle illumination device of clause 37, wherein the holder comprises a non-motor vehicle.

41. A vehicle lighting system comprising:
a light source configured so that light from the light source illuminates a portion of a road surface;
a processor, having an input and output signal; and
a controller, receiving an input signal from the processor input and having an output signal to the light source.

42. The lighting system of clause 41, wherein the vehicle lighting system is stationary and provides lighting for a vehicle user.

43. The lighting system of clause 41, wherein the vehicle lighting system is in motion and provides lighting for one of a pedestrian and another vehicle.

44. The lighting system of clause 41, wherein the light source projects an image on the road surface.

45. The lighting system of clause 41, wherein the vehicle is one of automobile, truck, bus, train, aircraft, motorcycles, scooters, forklifts, and watercraft.

46. The lighting system of clause 41, further comprising illumination of an object or pedestrian.

47. The lighting system of clause 46, further comprising spot illumination capable of following a moving object or pedestrian.

48. The lighting system of clause 43, wherein the projection is visible to a pedestrian or another vehicle driver.

49. The lighting system of clause 48, wherein the other vehicle is one of automobile, truck, bus, train, aircraft, motorcycles, scooters, forklifts, watercraft, bicycle, scooter, Segway and skates.

50. The lighting system of clause 41, wherein the light source comprises one of a LED and laser.

51. The lighting system of clause 41, wherein the light source comprises a LED array.

52. The lighting system of clause 41, wherein the light source comprises a LED array capable of emitting visible light of at least one of white, amber, and red.

53. The lighting system of clause 41, wherein the light source comprises a microLED array.

54. The lighting system of clause 41, wherein the light source comprises a laser and wavelength converter.

55. The lighting system of clause 41, wherein the processor receives the input signal from a computer of the vehicle.

56. The lighting system of clause 41, wherein the system is further configured to provide a spot of reduced horizontal illuminance that follows a moving object or pedestrian along the portion of the road surface for increased contrast.

57. The lighting system of clause 56, wherein the system further comprises a projection at least partially surrounding and following a pedestrian.

58. The lighting system of clause 57, wherein the projection is one of circular, oval, square, and rectangular.

59. The lighting system of clause 56, wherein the projection further comprises an arrow that indicates the direction of the pedestrian.

60. The lighting system of clause 41, wherein the system further comprises a projection of one of a traffic sign and text message visible to a vehicle driver.

61. The lighting system of clause 41, wherein the system further provides a projection that comprises one or more color.

62. The lighting system of clause 61, wherein the color is one or more of white, amber, and red.

63. The lighting system of clause 53, wherein the microLED array comprises LED chips, mounted and electrically connected to CMOS circuitry on a silicon wafer, wherein the LED chips are separated by a dielectric and metal that extends above a semiconductor surface of the LED chip and is filled with a wavelength converter.

64. The lighting system of clause 46, wherein the system comprises a horizontal illuminance that is at least twice the vertical illuminance.

65. The lighting system of clause 46, wherein the system comprises a horizontal illuminance that is at least five times the vertical illuminance.

66. The lighting system of clause 46, wherein the horizontal illuminance of the projection is at least twice the horizontal illuminance of the surrounding pavement.

67. The lighting system of clause 46, wherein the horizontal illuminance of the projection is at least equal to the vertical illuminance of the object or pedestrian.

68. The lighting system of clause 46, wherein the horizontal illuminance of the projection is greater than the vertical illuminance of the pedestrian.

69. The lighting system of clause 41, wherein the system further comprises a transceiver capable of communication with a network.

70. The lighting system of clause 41, wherein the system further comprises a transceiver capable of communication with at least one of a vehicle, a mobile phone, and a remote server over the network.

What is claimed is:

1. A vehicle lighting system comprising:
one or more light sources comprising a microLED array, the microLED array comprising a plurality of pixels each being 500 microns or less in size and arranged in a matrix, a spacing between adjacent pixels being 50 microns or less, the pixels mounted on and electrically connected to CMOS circuitry;
one or more detectors arranged to detect an object or person exterior to the vehicle;
a processor configured to receive and process signals from the one or more detectors; and
a controller configured to receive signals from the processor and in response to detection by the processor of an object or person on a roadway to control the one or more light sources to provide illumination to the object or person that increases contrast of the object or person against the roadway.

2. The vehicle lighting system of claim 1, wherein the one or more light sources comprises a laser.

3. The vehicle lighting system of claim 1, wherein the CMOS circuitry is arranged to switch individual ones of the pixels on and off.

4. The vehicle lighting system of claim 3, wherein the LED array is capable of emitting visible light of at least one of white, amber, and red colors.

5. The vehicle lighting system of claim 1, wherein the one or more light sources comprise an infrared (IR) light source.

6. The vehicle lighting system of claim 5, wherein the IR light source comprises a VCSEL array.

7. The vehicle lighting system of claim 1, wherein the one or more detectors comprise at least one of ultrasonic, radar, and LiDAR.

8. The vehicle lighting system of claim 1, wherein the controller is configured to control the one or more light sources to provide a projection at least partially surrounding and following the object or person as the object or person moves on the road surface.

9. The vehicle lighting system of claim 8, wherein the projection is one of circular, oval, square, and rectangular.

10. The vehicle lighting system of claim 1, wherein the controller is configured to control the one or more light sources to provide a projection on the road surface comprising an arrow that indicates the direction of travel of the vehicle, a moving object or person, or of another vehicle.

11. The vehicle lighting system of claim 1, wherein the controller is configured to control the one or more light sources to provide a projection on the roadway, visible to another vehicle driver, comprising a traffic sign, a text message, or a traffic sign and a text message.

12. The vehicle lighting system of claim 11, wherein the projection comprises one or more color.

13. The vehicle lighting system of claim 12, wherein the color is one of white, amber, and red.

14. A vehicle lighting system comprising:
one or more light sources comprising a microLED array that comprises a plurality of pixels each 500 microns or less in size, spacing between adjacent pixels being 50 microns or less, the pixels electrically connected to CMOS circuitry;
one or more detectors;
a processor configured to receive and process signals from the one or more detectors to detect objects or people exterior to the vehicle; and
a controller configured to receive signals from the processor and in response to detection by the processor of an object or person on a roadway to control the one or more light sources to provide a projection on a roadway.

15. The vehicle lighting system of claim 14, wherein the one or more light sources comprises a laser.

16. The vehicle lighting system of claim 14, wherein a horizontal illuminance of the projection is at least twice a horizontal illuminance of a surrounding area.

17. The vehicle lighting system of claim 14, wherein the CMOS circuitry is on a silicon wafer, and the pixels are separated by a dielectric and metal that extends above a semiconductor surface of the pixels and is filled with a wavelength converter.

18. A vehicle lighting system comprising:
one or more light sources;
one or more detectors configured to operate in the infrared (IR), ultrasonic, radar, and/or LiDAR range and arranged to detect an object or person exterior to the vehicle;
a processor configured to receive and process signals from the one or more detectors; and
a controller configured to receive signals from the processor and in response to detection by the processor of an object or person on a roadway to control the one or more light sources to provide illumination to the object or person that increases contrast of the object or person against the roadway.

19. The vehicle lighting system of claim 18, wherein the one or more light sources is a visible light source, and the one or more detectors is integrated together with the one or more light sources in a same fixture.

20. The vehicle lighting system of claim 18, wherein the one or more detectors is a camera configured to operate in the IR range.

* * * * *